US011248993B2

(12) United States Patent
Tsai

(10) Patent No.: US 11,248,993 B2
(45) Date of Patent: Feb. 15, 2022

(54) SYSTEMS AND METHODS FOR DIRECT PARTICLE SAMPLING

(71) Applicant: Colorado State University Research Foundation, Fort Collins, CO (US)

(72) Inventor: Su-Jung (Candace) Tsai, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 0 days.

(21) Appl. No.: 16/123,241

(22) Filed: Sep. 6, 2018

(65) Prior Publication Data

US 2019/0250076 A1 Aug. 15, 2019

Related U.S. Application Data

(60) Provisional application No. 62/631,132, filed on Feb. 15, 2018.

(51) Int. Cl.
  *G01N 1/22* (2006.01)
  *G01N 15/06* (2006.01)
  *G01N 15/14* (2006.01)
  *G01N 15/00* (2006.01)

(52) U.S. Cl.
  CPC ......... *G01N 1/2205* (2013.01); *G01N 1/2208* (2013.01); *G01N 1/2273* (2013.01); *G01N 15/0618* (2013.01); *G01N 15/1468* (2013.01); *G01N 2001/2223* (2013.01); *G01N 2015/0046* (2013.01)

(58) Field of Classification Search
  CPC .................................................. G01N 1/2205

USPC ......................................... 250/306, 307, 311
See application file for complete search history.

(56) References Cited

U.S. PATENT DOCUMENTS

| 5,376,270 A * | 12/1994 | Spearman ............ B01D 29/012 210/445 |
| 2004/0228568 A1* | 11/2004 | Letant .............. G01N 33/54373 385/12 |
| 2006/0024710 A1* | 2/2006 | Weiss ....................... C12Q 1/24 435/6.13 |

(Continued)

OTHER PUBLICATIONS

Gorbunov et al., A Novel Size-Selective Airborne Particle Size Fractionating Instrument for Health Risk Evaluation, 2008, Ann. Occup. Hyg., vol. 54, No. 3, pp. 225-237. (Year: 2008).*

(Continued)

*Primary Examiner* — Jason L McCormack
(74) *Attorney, Agent, or Firm* — Polsinelli PC

(57) ABSTRACT

Implementations described and claimed herein provide systems and methods for sampling particles from air. In one implementation, an inlet opening is defined in a proximal end of a cassette top, and the inlet opening has an inlet diameter. An internal surface extends along an airflow curve from the inlet opening to an internal cavity. A sampling substrate is formed by at least one grid attached to a filter. The sampling substrate is disposed in the internal cavity at an internal distance from the inlet opening. The inlet opening and the airflow curve of the internal surface generate an airflow of the air to the sampling substrate. The sampling substrate collects a set of the particles from the air, and the inlet diameter, the airflow, and the internal distance dictate a cutoff diameter of the set of particles collected from the air by the sampling substrate.

17 Claims, 8 Drawing Sheets

(56) References Cited

U.S. PATENT DOCUMENTS

| | | | |
|---|---|---|---|
| 2007/0043520 A1* | 2/2007 | Friedlander | G01N 15/0266<br>702/29 |
| 2014/0200335 A1* | 7/2014 | Olkowski | D21C 3/04<br>530/500 |
| 2015/0364295 A1* | 12/2015 | Cyrus | H01J 37/28<br>250/307 |

OTHER PUBLICATIONS

Gorbunov et al., A Novel Size-Selective Airborne Particle Size Fractionating Instrument for Health Risk Evaluation, 2008, Ann. Occup. Hyg., vol. 53, No. 3. pp. 225-237. (Year: 2008).*

Cena L, Peters T (2011) Characterization and control of airborne particles emitted during production of epoxy/carbon nanotube nanocomposites. J Occup Environ Hyg 8:86-92.

Cena LG, Anthony TR, Peters TM (2011) A personal nanoparticle respiratory deposition (NRD) sampler. Environ Sci Technol 45(15):6483-6490.

Dahm MM, Evans DE, Schubauer-Berigan MK, Birch ME, Fernback JE (2012) Occupational exposure assessment in carbon nanotube and nanofiber primary and secondary manufacturers. Ann Occup Hyg 56(5):542-556.

Fleischer T, Grunwald A (2007) Making nanotechnology developments sustainable. A role for technology assessment? J Clean Prod 16:889-898.

Gorbunov B, Priest ND, Muir RB, Jackson PR, Gnewuch H (2009) A novel size-selective airborne particle size fractionating instrument for health risk evaluation. Ann Occup Hyg 53(3):225-237.

Johnson DR, Methner MM, Kennedy AJ, Steevens JA (2010) Potential for occupational exposure to engineered carbon-based nanomaterials in environmental laboratory studies. Environ Health Perspect 118(1):49-54.

Kuhlbusch TAJ, Asbach C, Fissan H, Gohler D, Stintz M (2011) Nanoparticle exposure at nanotechnology workplaces: a review. Part Fibre Toxicol 8:1-18.

Lee JH, Lee SB, Bae GN, Jeon KS, Yoon JU, Ji JH, Sung JH, Lee BG, Yang JS, Kim HY, Kang CS, Yu IJ (2010) Exposure assessment of carbon nanotube manufacturing workplaces. Inhal Toxicol 22:369-381.

Leith D, Miller-Lionberg D, Casuccio G, Lersch T, Lentz H, Marchese A, Volckens J (2014) Development of a transfer function for a personal, Thermophoretic nanoparticle sampler. Aerosol Sci Technol 48(1):81-89.

Lo LM, Dunn K, Hammond D, Marlow D, Topmiller J, Tsai S, Ellenbecker M, Huang C (2012) Evaluation of engineering controls in a manufacturing facility producing carbon nanotube-based products. National Institute for Occupational Safety and Health (NIOSH) Division of Applied Research and Technology Engineering and Physical Hazard Branch EPHB Report No. 356-13a.

Maynard A, Baron P, Foley M, Shvedova A, Kisin E, Castranova V (2004) Exposure to carbon nanotube material: aerosol release during the handling of unrefined single walled carbon nanotube material. J Toxic Environ Health A 67(1):87-107.

Mazzuckelli LF, Methner MM, Birch ME, Evans DE, Ku BK, Crouch K, Hoover MD (2007) Case study: identification and characterization of potential sources of worker exposure to carbon nanofibers during polymer composite laboratory operations. J Occup Environ Hyg 4(12):D125-D130.

Methner M, Crawford C, Geraci C (2012) Evaluation of the potential airborne release of carbon nanofibers during the preparation, grinding, and cutting of epoxy-based nanocomposite material. J Occup Environ Hyg 9(5):308-318.

Miller A, Frey G, King G, Sunderman C (2010) A handheld electrostatic precipitator for sampling airborne particles and nanoparticles. Aerosol Sci Technol 44(6):417-427.

NIOSH (1994) Asbestos by TEM. Cincinnati, OH, Department of Health and Human Services, Centers for Disease Control and Prevention, National Institute for Occupational Safety and Health. NIOSH method 7402, issue 2.

NIOSH (2008) Safe nanotechnology in the workplace. Cincinnati, Department of Health and Human Services, Centers for Disease Control and Prevention, National Institute for Occupational Safety and Health. NIOSH (DHHS) publication No. 2008-112.

NIOSH (2009) Approaches to safe technology—managing the health and safety concerns associated with engineered nanomaterials. Cincinnati, OH, Department of Health and Human Services, Centers for Disease Control and Prevention, National Institute for Occupational Safety and Health. DHHS (NIOSH) publication No. 2009-125.

NIOSH (2011) Occupational exposure to titanium dioxide. Cincinnati, Department of Health and Human Services, Centers for Disease Control and Prevention, National Institute for Occupational Safety and Health. DHHS (NIOSH) publication No. 2011-160.

NIOSH (2013) Current intelligence bulletin 65—occupational exposure to carbon nanotubes and nanofibers. Cincinnati, Department of Health and Human Services, Centers for Disease Control and Prevention, National Institute for Occupational Safety and Health. DHHS (NIOSH) publication No. 2013-145.

NSTC (2006) Environmental, health, and safety research needs for engineered nanoscale materials. Washington, D.C., National Science and technology council (NSTC), the National Nanotechnology Initiative, executive Office of the President of the United States.

Oberdörster E (2004) Manufactured nanomaterials (fullerenes, C60) induce oxidative stress in the brain of juvenile largemouth bass. Environ Health Perspect 112(10):1058-1062.

Park J, Kwak BK, Bae E, Lee J, Kim Y, Choi K, Yi J (2009) Characterization of exposure to silver nanoparticles in a manufacturing facility. J Nanopart Res 11(7):1705-1712.

Roco MC (2003) Broader societal issues of nanotechnology. J Nanopart Res 5:181-189.

Roco MC (2011) Erratum to: the long view of nanotechnology development: the National Nanotechnology Initiative at 10 years. J Nanopart Res 13:1335-1335.

Schindelin J, Arganda-Carreras I, Frise E, Kaynig V, Longair M, Pietzsch T, Preibisch S, Rueden C, Saalfeld S, Schmid B (2012) Fiji: an open-source platform for biological-image analysis. Nat Methods 9(7):676-682.

Schulte P, Geraci C, Zumwalde R, Hoover M, Castranova V, Kuempel E, Murashov V, Vainio H, Savolainen K (2008) Sharpening the focus on occupational safety and health in nanotechnology. Scand J Work Environ Health 34(6):407-409.

Shvedova A, Castranova V, Kisin ER, Schwegler-Berry D, Murray AR, Gandelsman VZ, Maynard A, Baron P (2003) Exposure to carbon nanotube material: assessment of nanotube cytotoxicity using human keratinocyte cells. J Toxic Environ Health A 66:1909-1926.

Sigma M (n.d.) GTTP02500 Isopore Membrane Filter. Jan. 2018.

Singh S, Nalwa HS (2007) Nanotechnology and health safety—toxicity and risk assessments of nanostructured materials on human health. J Nanosci Nanotechnol 7(9):3048-3070.

Spurny K, Lodge J, Frank E, Sheesley D (1969) Aerosol filtration by means of Nuclepore filters structural and filtration properties. ES&T 3(5).

Su W-C, Vincent JH (2004) Experimental measurements and numerical calculations of aspiration efficiency for cylindrical thin-walled aerosol samplers in perfectly calm air. Aerosol Sci Technol 38(8).

Systems D (2017) ProX SLS 500. Retrieved from: https://www.3dsystems.com/3d-printers/prox-sls-500.

Takagi A, Hirose A, Nishimura T, Fukumori N, Ogata A, Ohashi N, Kitajima S, Kanno J (2008) Induction of mesothelioma in p53+/- mouse by intraperitoneal application of multi-wall carbon nanotube. J Toxicol Sci 33(1):105-116.

Takagi A, Hirose A, Futakuchi M, Tsuda H, Kanno J (2012) Dose-dependent mesothelioma induction by intraperitoneal administration of multi-wall carbon nanotubes in p53 heterozygous mice. Cancer Sci 103(8):1440-1444.

Tsai SJ, Ada E, Isaacs J, Ellenbecker MJ (2009a) Airborne nanoparticle exposures associated with the manual handling of nanoalumina and nanosilver in fume hoods. J Nanopart Res 11(1):147-161.

Tsai SJ, Hofmann M, Hallock M, Ada E, Kong J, Ellenbecker MJ (2009b) Characterization and evaluation of nanoparticle release

(56) References Cited

OTHER PUBLICATIONS during the synthesis of single-walled and multi-walled carbon nanotubes by chemical vapor deposition. Environ Sci Technol 43(15):6017-6023.

Tsai CJ, Liu CN, Hung SM, Chen SC, Uang SN, Cheng YS, Zhou Y (2012) Novel active personal nanoparticle sampler for the exposure assessment of nanoparticles in workplaces. Environ Sci Technol 46(8):4546-4552.

Warheit DB, Sayes CM, Reed KL, Swain KA (2008) Health effects related to nanoparticle exposures: environmental, health and safety considerations for assessing hazards and risks. Pharmacol Ther 120(1):35-42.

Zarringhalam H, Hopkinson N, Kamperman NF, De Vlieger JJ (2006) Effects of processing on microstructure and properties of SLS nylon 12. Mater Sci Eng A (435).

* cited by examiner

SYSTEMS AND METHODS FOR DIRECT PARTICLE SAMPLING

CROSS-REFERENCE TO RELATED APPLICATIONS

The present application claims priority under 35 U.S.C. § 119 to U.S. Provisional Application No. 62/631,132, entitled "Sampler Design for Nanoparticles and Respirable Particles with Direct Analysis Feature" and filed on Feb. 15, 2018, which is specifically incorporated in its entirety herein.

FIELD

Aspects of the present disclosure relate generally to the direct collection and analysis of airborne particles and more particularly to the collection of particles in the nanometer and respirable sizes directly onto a filter and a grid, where the particles may be directly analyzed using a transmission electron microscope on the grid and a scanning electron microscope on the filter.

BACKGROUND

Nanomaterials may have toxicological effects, presenting a risk of harm to the environment and humans. Airborne nanomaterials can expose humans to such effects through inhalation. To assess the exposure, a particle sampler is typically used where size selective sampling separates nanoparticles from larger particles for collection. Generally, nanoparticles may be collected through indirect or direct methods. Indirect methods are typically plagued by labor intensity, particle transfer, and the potential for particle agglomerate changes though the preparation process. Direct methods involve directly depositing nanoparticles from air on a collection device, such as an electrostatic precipitation sampler (ESP) or thermophoretic sample (TPS). ESP and TPS devices typically only collect particles with diameters smaller than a micrometer in the nanometer size range, and only some of the particles drawn into the device are collected, with the rest directed out of the device with the exhaust air. As such, neither approach conventionally provides an accurate assessment of exposure of potentially toxic respirable particles.

It is with these observations in mind, among others, that various aspects of the present disclosure were conceived and developed.

SUMMARY

Implementations described and claimed herein address the foregoing problems by providing systems and methods for sampling particles from air. In one implementation, a cassette housing is formed from a cassette top and a cassette bottom. An internal cavity is formed within the cassette housing. An inlet opening is defined in a proximal end of the cassette top, and the inlet opening has an inlet diameter. An internal surface is defined in the top cassette. The internal surface extends along an airflow curve from the inlet opening to the internal cavity. A filter has a plurality of pores, and a sampling substrate formed by at least one grid attached to the filter. The sampling substrate is disposed in the internal cavity at an internal distance from the inlet opening. The inlet opening and the airflow curve of the internal surface generate an airflow of the air to the sampling substrate. The sampling substrate collects a set of the particles from the air, and the inlet diameter, the airflow, and the internal distance dictate a cutoff diameter of the set of particles collected from the air by the sampling substrate.

In another implementation, air is drawn into a cassette housing through an inlet opening. The inlet opening has an inlet diameter. An airflow of the air to a sampling substrate is generated using the inlet opening and an internal surface extending along an airflow curve from the inlet opening to the sampling substrate. The sampling substrate is formed by attaching at least one grid to a filter and is disposed at an internal distance from the inlet opening. A cutoff diameter of the particles is dictated based on the inlet diameter, the airflow, and the internal distance. A set of the particles is collected from the air on the sampling substrate based on the cutoff diameter.

In another implementation, a first image of a first set of collected particles captured using a transmission electron microscope on a grid is received. The first set of collected particles is collected directly on the grid of a sampling substrate. A second image of a second set of collected particles captured using a scanning electron microscope on a filter is received. The second set of collected particles is collected directly on the filter of the sampling substrate. The sampling substrate is disposed at an internal distance from an inlet opening defined in a cassette housing. The inlet opening has an inlet diameter. A cutoff diameter of the first set of collected particles and the second set of collected particles is dictated by the inlet diameter, the internal distance, and an airflow generated using the inlet opening and an internal surface extending along an airflow curve from the inlet opening to the sampling substrate. A particle count of the first set of collected particles and the second set of collected particles is determined by analyzing the first image and the second image using at least one computing unit. One or more particle sizes of the first set of collected particles and the second set of collected particles is determined by analyzing the first image and the second image using the at least one computing unit. An airborne particle concentration of the air is determined based on the particle count and the one or more particle sizes.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1:
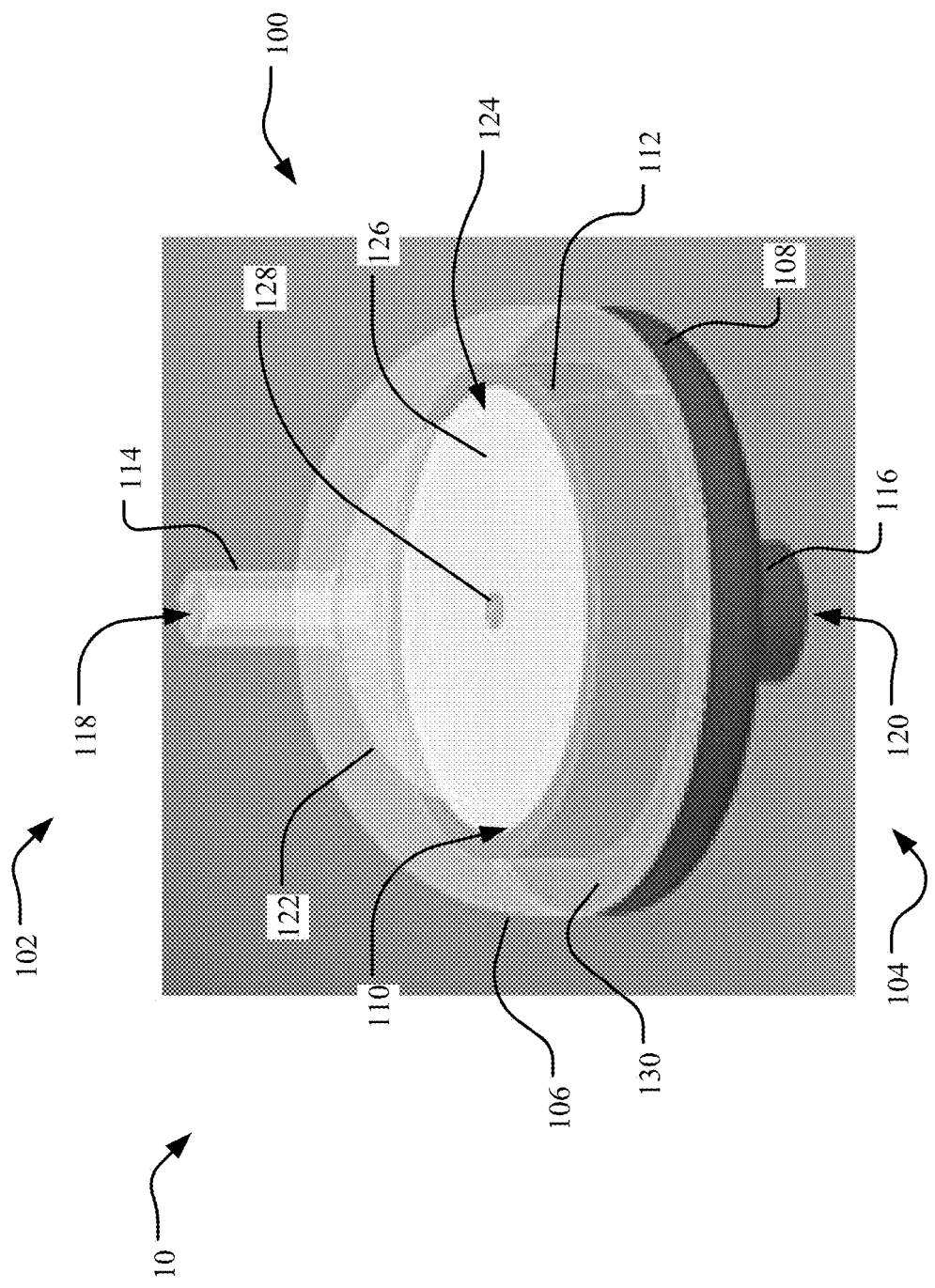
FIG. 1 is a side perspective view of an example particle sampler.
Figure 2:
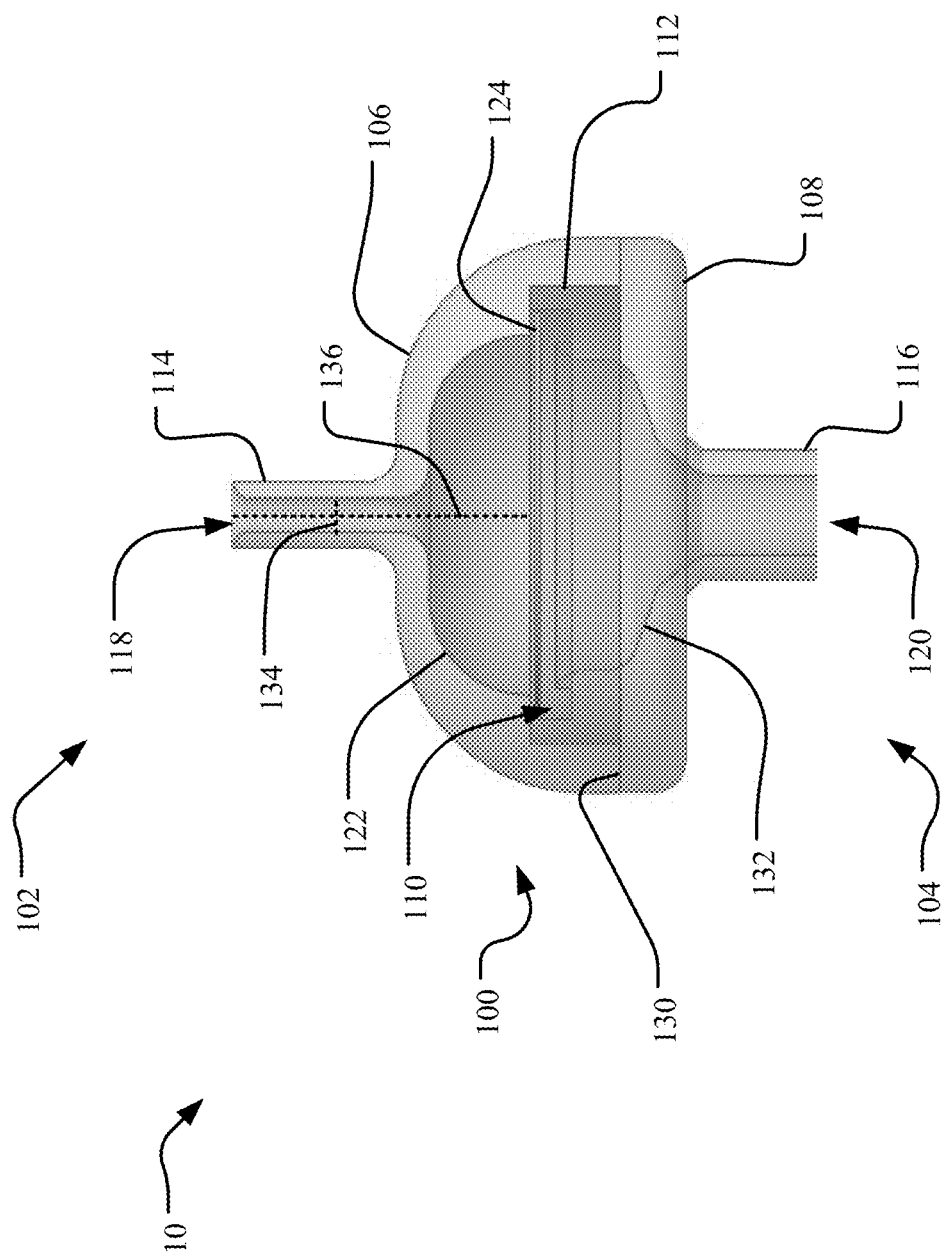
FIG. 2 is a side view of the particle sampler.
Figure 3:
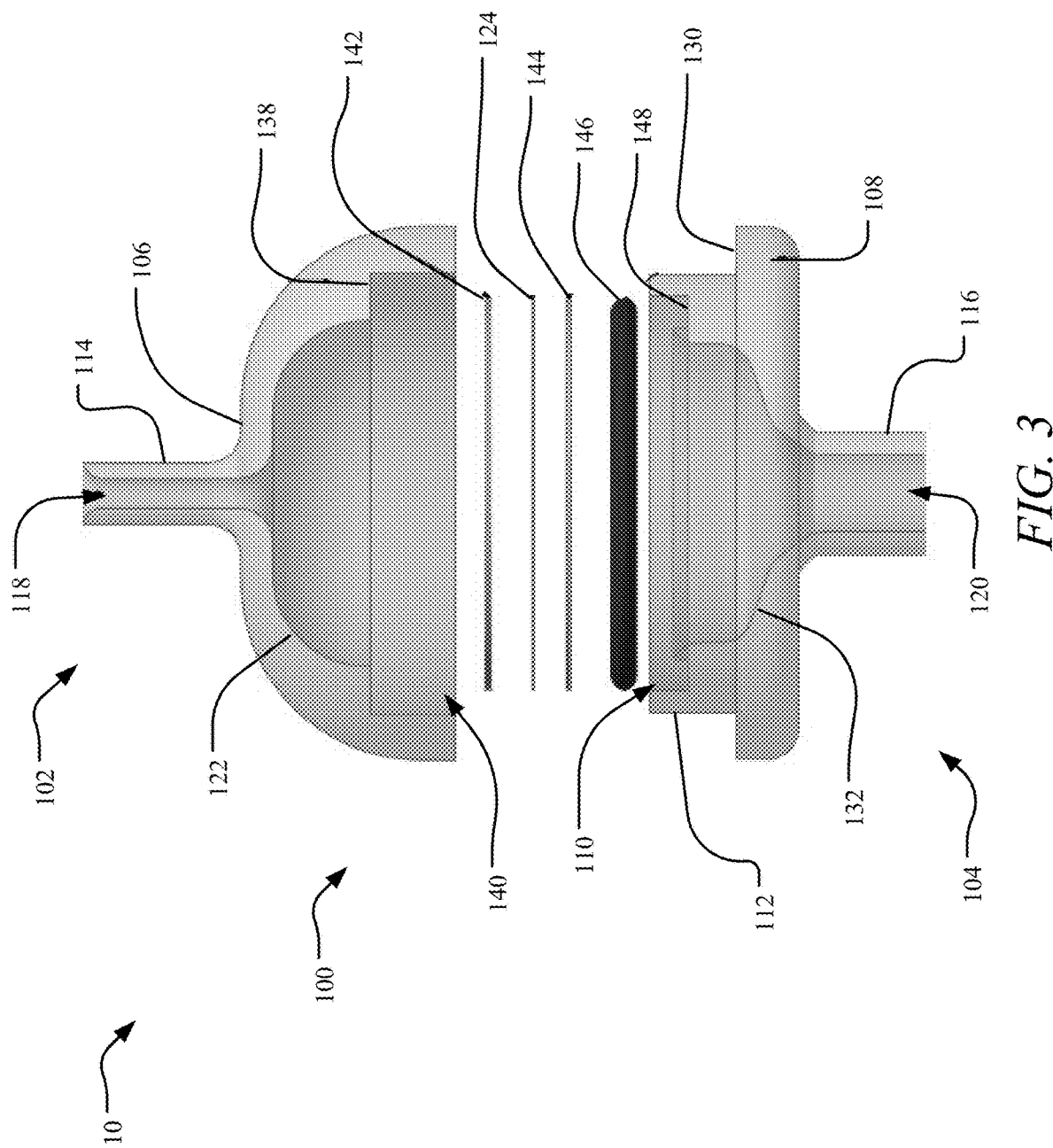
FIG. 3 shows an exploded side view of the particle sampler.
Figures 4A, 4B:
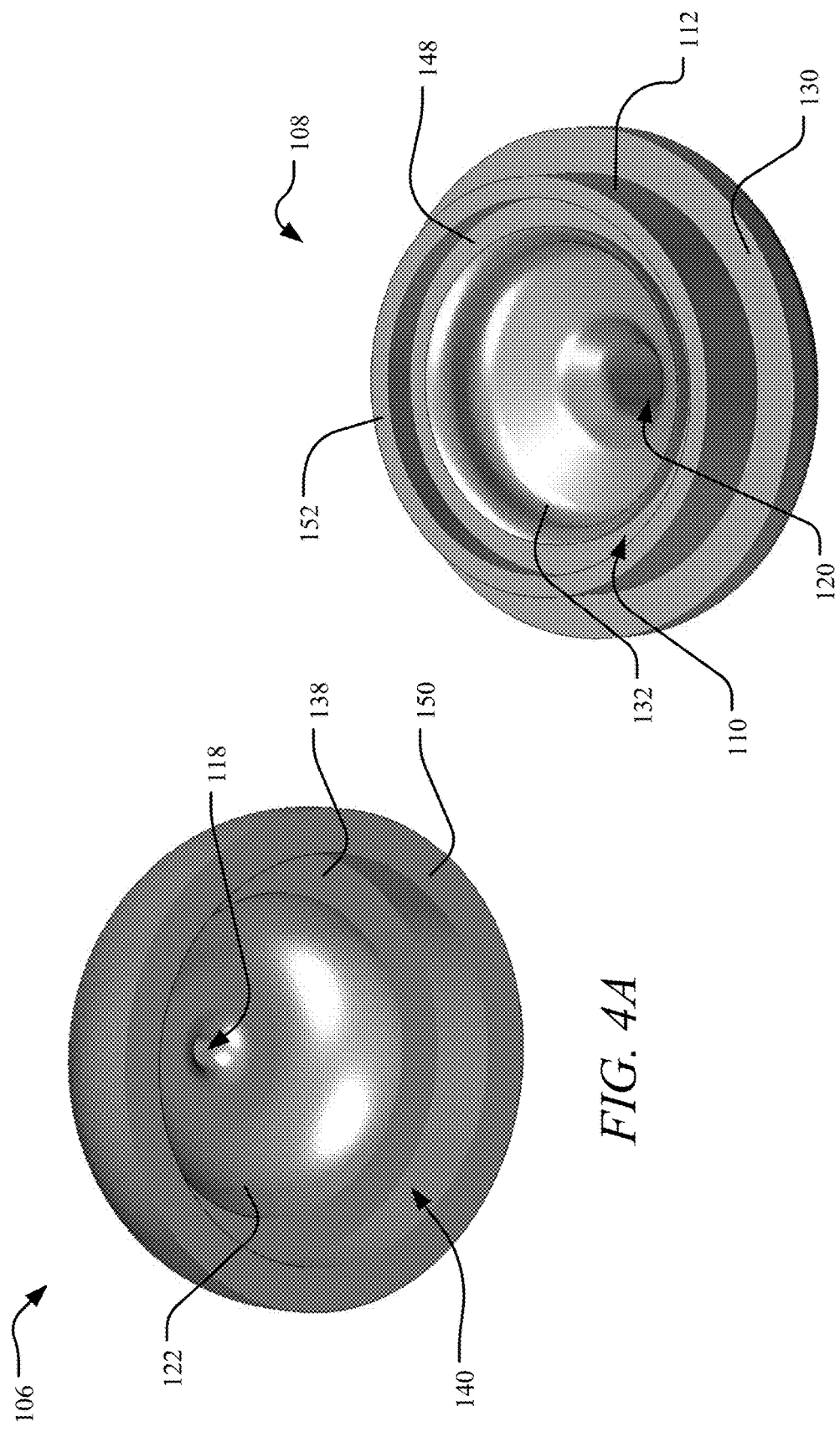
FIG. 4A shows a bottom perspective view of a cassette top of the particle sampler.
FIG. 4B illustrates a top perspective view of a cassette bottom of the particle sampler.
Figure 5:
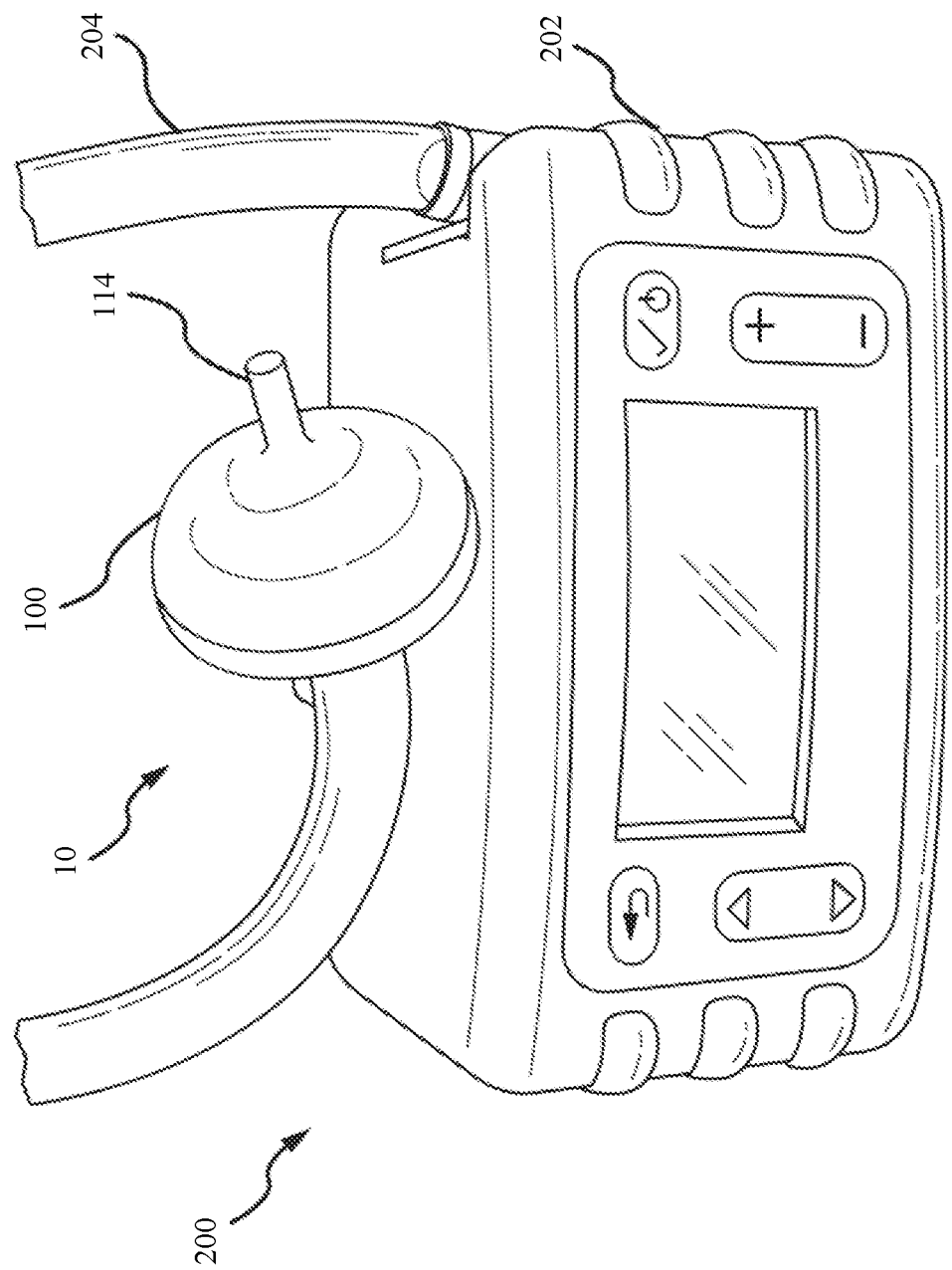
FIG. 5 depicts an example air sampling system.

Aspects of the presently disclosed technology relate to systems and methods for sampling particles from air. In one aspect, an air sampler collects particles in the nanometer and respirable sizes directly onto a membrane filter and a transmission electron microscope (TEM) grid through diffusion. The TEM grid is secured to the membrane filter, for example, at a center to form a sampling substrate. The sampling substrate is disposed in an internal cavity of a cassette housing. An inlet opening is defined in the cassette housing into which air is drawn. The cassette housing has a unique geometry, including a diameter of the inlet opening and an internal surface extending from the inlet opening to the internal cavity. The unique geometry of the cassette housing generates a resulting air flow to the sampling substrate, which together control a cutoff diameter of the collected particles. The cutoff diameter may ensure that only respirable particles are sampled. The air sampler may be worn by an individual as a personal air sampler for collecting particles in various environmental settings. Particles collected by the air sampler are directly analyzable by a TEM on the grid and by a scanning electron microscope (SEM) on the filter. Exposure may be assessed through particle counts and elemental composition analysis of images captured by the TEM and/or SEM.

For a detailed description of an example air sampler 10, reference is made to FIGS. 1-4B. In one implementation, the air sampler 10 includes a cassette housing 100 having a proximal end 102 and a distal end 104. The air sampler 10 may be manufactured through a variety of manufacturing processes. For example, the air sampler 10 may be manufactured by 3D printing through selective laser sintering (SLS) of nylon powder. Electrostatic effects of nonconductive nylon cyclone may have a potential to affect particle collection. However, nylon powder utilized in 3D printing does not have this affect and may be altered for collecting conductivity-sensitive substances. Other manufacturing methods and systems are contemplated. The air sampler 10 is very lightweight with a low sampling air flow and thus is easily used as a personal sampler in the field for personal exposure and/or environmental sampling.

The cassette housing 100 is formed from a cassette top 106 and a cassette bottom 108. The cassette top 106 and cassette bottom 108 may be one integral piece forming the cassette housing 100 or separate pieces connected to each other, which may be releasably or permanently fixed to each other. The cassette housing 100 forms an interior, which may include an internal cavity 110. The internal cavity 110 may be formed through a connection between the cassette top 106 and the cassette bottom 108. For example, the cassette bottom 108 may include a protrusion 112 receivable into the cassette top 106. The protrusion 112 defines a distal portion of the internal cavity 110 that when the protrusion 112 is received in the cassette top 106 forms the internal cavity 110.

In one implementation, the top cassette 106 includes an inlet 114 disposed at the proximal end 102 of the cassette housing 100 and an outlet 116 disposed at the distal end 104 of the cassette housing 100. The inlet 114 includes an inlet opening 118 through which air is drawn into an interior of the cassette housing 100 and directed through the internal cavity 110. The outlet 116 includes an outlet opening 120 through which air is expelled from the interior of the cassette housing 100.

The internal geometry of the cassette housing 100 generates an air flow and controls a direction of the air flow from the inlet opening 118 through the internal cavity 110 and out the outlet opening 120. In one implementation, in the interior of the cassette housing 100, the cassette top 106 includes an internal surface 122 extending along an airflow curve from the inlet opening 118 to the internal cavity 110 in which a sampling substrate 124 is disposed. The airflow curve includes one or more surface contours. For example, the airflow curve may be smooth and extend along a first contour outwardly from and generally traverse to the inlet opening 118 and a second contour curving outwardly and distally from the first contour to the internal cavity 110. The inlet opening 118 and the airflow curve of the internal surface 122 generate an airflow of air drawn into the interior of the cassette housing through the inlet opening 118. The airflow is directed from the inlet opening 118 to the sampling substrate 124.

The inlet opening 118 has an inlet diameter 134, and the sampling substrate 124 is disposed an internal distance 136 from the inlet opening 118. In one implementation, the inlet diameter 134, the airflow, and the internal distance 136 dictate a cutoff diameter of a set of particles collected from the air by the sampling substrate 124. The cutoff diameter may be a mass median aerodynamic diameter (MMAD) of approximately 3.8 μm, which captures particles in the nanometer and respirable sizes. The maximum aerodynamic diameter entering the air sampler 10 may be approximately 8 μm.

In one implementation, the sampling substrate 124 includes a filter 126 and a grid 128. The grid 128 is directly attached to the filter 126 using tape, an adhesive, a mechanical attachment, and/or other attachment mechanisms. In one implementation, the grid 128 is attached to a center of the filter 126 proximal to the inlet opening 118. However, the grid 128 may be attached at any location of the filter 126. Further, there may be a plurality of grids 128 disposed at various locations on the filter 126. The grid 128 may be a filmed TEM grid, and the filter 126 may be a capillary pore membrane filter. As the airflow is directed across the sampling substrate 124, nanoparticles are drawn across the grid 128, a first set of those particles migrate to the surface of the grid 128 by diffusion. A second set of particles including the remaining nanoparticles and larger particles below the cutoff diameter are collected on the filter 126 by diffusion. Stated differently, the grid 126 collects primary and small agglomerates of submicrometer nanoparticles via Brownian motion as the airflow is directed across a proximal end of the grid 128, and the filter 126 collects particles over a wide size range via diffusion and sieving as the airflow is directed through pores of the filter 126. Nanoparticles and larger particles are collected on a proximal surface of the filter 126 between the pores.

The airflow is directed through the sampling substrate 124 in the internal cavity 110 along an outlet curve 132 to the outlet opening 120, which expels the air. In one implementation, the outlet curve 132 extends distally along one or more contours from the internal cavity 110 to the outlet opening 120. The internal cavity 110 extends between a proximal surface 152 and a distal surface 148. The internal cavity 110 is defined in the protrusion 112, which extends between the proximal surface 152 and a surface of a shelf 130 of the cassette bottom 108. The shelf 130 extends radially outwardly from the protrusion 112 and is adapted to receive a distal surface 150 of the cassette top 106. When the shelf 130 meets the distal surface 150, the protrusion 112 extends proximally into a proximal cavity 140, and the proximal surface 152 of the cassette bottom 108 meets a proximal internal surface 138 of the cassette top 106.

The proximal cavity 140 and/or the internal cavity 110 may house one or more components to support the sampling substrate 124 or otherwise facilitate the collection of particles by the sampling substrate 124. For example, the sampling substrate 124 is supported by a support screen 144, which may be metal, and disposed between a proximal O-ring 142 and a distal O-ring 146.

As described herein, the air sampler 10 collects particles in the nanometer and respirable size ranges with the aerodynamic cutoff diameter of approximately 3.8 μm for respirable particles. The particle size entering the cassette housing 100 is determined based on the inlet diameter 134 of the inlet opening 118 and the airflow. A shape of the inlet opening 118 may further impact the particle size entering the cassette housing 100, thereby providing pre-separation of the particles. For example, the inlet opening 118 may be round. Such a round shape may generate an aspiration efficiency following a sigmoidal curve like a respirable pre-separator curve with the cutoff diameter being dictated by the inlet diameter 134, the airflow, and/or the internal distance 136. The geometry of the air sampler 10 is such that inlet aspiration efficiency is minimally affected by sampling direction.

In one particular implementation, the inlet opening 118 is circular in shape, with the inlet diameter is approximately 2 mm, and the internal distance 136 is approximately 6 mm between the sampling substrate 124 and the inlet opening 118 at a proximal end of the cassette housing 100, when the cassette housing 100 is approximately 25 mm in diameter. The internal surface 122 is smooth, thereby generating a smooth air streamline of the airflow for particles moving from the inlet opening 118 towards the sampling substrate 124. As described herein, each of these factors dictates the sizes of particles entering the air sampler 10 and the cutoff diameter of particles collected on the sampling substrate 124. In one particular implementation, the filter 126 of the sampling substrate 124 has a diameter of approximately 25 mm with pores having a size of approximately 0.22 μm and made from polycarbonate. The grid 128 is a TEM-copper-grid in 400 mesh with a $SiO_2$ coated film. It will be appreciated that other coated films and materials for the grid 128 may be used. The sampling substrate 124 may form a 23 mm diameter collecting area.

As described herein, particles are collected on both the filter 126 and the grid 128 through diffusion. In one implementation, airflow is directed through the sampling substrate 124 and aerosol particles are deposited on the grid 128 via Brownian diffusion. The diffusion of a particle is a function of the diffusion coefficient D, which may be given by the Stokes-Einstein equation:

$$D = \frac{kTC_c}{3\pi\eta d_p},$$

with k being Boltzman's constant, T being the absolute temperature, $C_c$ being the Cunningham slip correction factor, η being the gas viscosity, and $d_p$ being the particle diameter.

It will be appreciated that at standard conditions, including a constant temperature and viscosity, the diffusion coefficient depends only on the diameter, such that diffusion increases as diameter decreased. Since Brownian motion is random, a collection of aerosol particles of the same diameter will be displaced different distances along an arbitrary axis in any given time interval. The distance particles travel under Brownian motion approximates a normal distribution. Thus, the root mean square (rms) average distance for movement of a collection of particles in time t by definition is equal to the standard deviation (σ) of the distribution and is given by:

$$\sigma = X_{rms} = \sqrt{2Dt} \qquad (2)$$

According to these relationships, during the time t that a particle spends passing the grid 128, smaller particles can expect to travel a larger average distance than larger ones, so a great portion of smaller particles would be expected to be found on the grid 128. Thus, nanoparticles, due to their large Brownian displacement, have a high probability of striking a TEM grid element as they pass by the grid 128.

In one particular non-limiting example, using an airflow of approximately 0.3 L/min through the cassette housing 100, the airflow is directed towards the grid 128 at a velocity of approximately 1 cm/s. Air streamlines striking a center of the grid 128 will be directed toward edges of the grid 128. If the grid 128 has a radius of 1.5 mm, air striking the center of the grid 128 will take approximately 0.15 s to reach the edge. Based on the relationships above, a 10 nm diameter particle, for example, has an rms displacement ($X_{rms}$) of 0.13 mm in 0.15 s. Since the $X_{rms}$ is also by definition its standard deviation, and 32% of any distribution values are greater than the standard deviation, 32% of the particles will have moved farther than this distance while passing over the grid 128. Half of these particles will move away from the surface of the grid 128 and half of them (16%) will move toward the surface of the grid 128 and deposit on the filmed opening space of the grid 128. Thus, 10 nm particles travelling on streamlines that pass within a few tenths of a millimeter of the surface of the grid 128 will have a high probability of being collected. In addition, flow so close to the surface of the grid 128 is likely to be in the frictional boundary layer, meaning that the velocities are lower than the free-stream velocities, the residence times are longer, and more collection by diffusion will occur. The calculated rms displacements range from 0.32 mm for a 4 nm diameter particle to 0.01 mm for a 300 nm diameter particle as shown in the table below, with particle diameters and corresponding parameters including diffusion coefficient (D), coefficient of diffusion collection ($N_D$), efficiency of diffusion ($E_D$), and root mean square displacement ($X_{rms}$):

| d (μm) | D (m²/s) | $N_D$ | $E_D$ | $X_{rms}$ (mm) |
|---|---|---|---|---|
| 0.004 | 3.35E−07 | 9377.3 | 1.00 | 0.32 |
| 0.005 | 2.15E−07 | 6018.3 | 1.00 | 0.25 |
| 0.006 | 1.5E−07 | 4198.8 | 1.00 | 0.21 |
| 0.008 | 8.46E−08 | 2368.1 | 1.00 | 0.16 |
| 0.01 | 5.45E−08 | 1525.6 | 1.00 | 0.13 |
| 0.015 | 2.45E−08 | 685.8 | 1.00 | 0.09 |
| 0.02 | 1.4E−08 | 391.9 | 1.00 | 0.06 |
| 0.03 | 6.39E−09 | 178.9 | 1.00 | 0.04 |
| 0.04 | 3.69E−09 | 103.3 | 1.00 | 0.03 |
| 0.05 | 2.43E−09 | 68.0 | 1.00 | 0.03 |
| 0.06 | 1.73E−09 | 48.4 | 1.00 | 0.02 |
| 0.08 | 1.03E−09 | 28.8 | 1.00 | 0.02 |
| 0.1 | 6.94E−10 | 19.4 | 1.00 | 0.01 |
| 0.15 | 3.51E−10 | 9.8 | 1.00 | 0.01 |

-continued

| d (μm) | D ($m^2$/s) | $N_D$ | $E_D$ | $X_{rms}$ (mm) |
|---|---|---|---|---|
| 0.2 | 2.23E−10 | 6.2 | 1.00 | 0.01 |
| 0.3 | 1.23E−10 | 3.4 | 1.00 | 0.01 |
| 0.4 | 8.31E−11 | 2.3 | 1.00 | 0.00 |
| 0.5 | 6.24E−11 | 1.7 | 1.00 | 0.00 |
| 0.6 | 4.98E−11 | 1.4 | 0.99 | 0.00 |
| 0.8 | 3.54E−11 | 1.0 | 0.98 | 0.00 |
| 1 | 2.74E−11 | 0.8 | 0.95 | 0.00 |

As illustrated with these values, particles across the entire nanometer size range will have a measurable displacement while passing over the surface of the grid 128, and particles throughout this size range will deposit on the grid 128 due to diffusion. These values indicate that a significant number of the nanometer-sized particles in the air flow impinging on the grid 128 will move to the grid surface and be collected.

With respect to the filter 126, in one implementation, particles enter the cassette housing 100 through the inlet opening 118 are distributed onto the filter 126, with particle agglomerates larger than the pore size (~220 nm) of the filter 126 being deposited by sieving. Particles smaller than the pore size will be deposited onto the surface of the filter 126 between pores by Brownian motion. The filter 126 may be a Nuclepore polycarbonate filter or otherwise a membrane filter with the efficiency of diffusion, $E_D$, on the filter 126 being:

$E_D$=1−0.081904 exp (−3.6568$N_D$)−0.09752 exp (−22.3045$N_D$)−0.03248 exp (−56.95 $N_D$)−0.0157 exp (−107.6$N_D$)− . . . , where the coefficient of diffusive collection, $N_D$, is greater than 0.01.

The remaining terms will approach zero, with the coefficient of diffusive collection being given by:

$$N_D = \frac{LDP}{R_0^2 q},$$

where L is we niter thickness (m), D is the diffusion coefficient, P is the filter porosity, $R_0$ is the pore radius of a clean filter (m), and q is the face velocity of air at the filter 126 (m/s).

In one particular non-limiting example, the filter 126 is a 0.22 μm porous polycarbonate filter with a thickness of 25 μm (Sigma), a porosity of 13.8%, a pore radius of 0.11 μm, and q of 0.01 m/s. The diffusion efficiency of the filter 126 is 100% for particles with diameters of 500 nm (0.5 μm) or smaller, and greater than 95% for particles of 1 μm to 0.5 μm as shown in the table above. Particles with diameters greater than the pore size (220 nm) will be collected with 100% efficiency.

Motion of a particle entering the inlet opening 118 and inside the cassette housing 100, can be characterized using the Stokes number (Stk). In this equation, τ is the relaxation time (s), $U_0$ is the air velocity, and $d_c$ is the cylinder diameter of airflow which has been analyzed separately for both the inlet diameter 134 (e.g., 2 mm) and diameter of the cassette housing 100 (e.g., 23 mm).

$$Stk = \tau \frac{U_0}{d_c}$$

$$\tau = \frac{\rho_p d_p^2 C_C}{18\eta},$$

where $\rho_p$ is particle density (kg/$m^3$).

When Stk>>1, particles continue moving in a straight line when the air turns, and when Stk<<1, particles follow the air streamlines. The particle motion behavior at the inlet opening 118 determines the particle sizes entering the inlet 114, as they follow and deviate from the air streamlines. This determines the maximum size of particles to be sampled by the air sampler 10, or in other words, the largest particle that can follow the sharply-curving streamlines at the inlet opening 118 and the internal surface 122.

Turning to FIG. 5, in one implementation, an air sampling system 200 includes the air sampler 10 connected to a sampling pump 202 with a nozzle 204. The air sampling system 200 may be worn by an individual and/or used to analyze air and particle exposure in a variety of environmental settings, such as mines, labs, plants, and/or the like. Examples of emitted particles in various settings that may be sampled include, laser printer printing, handling fumed silica powder, disturbing bulk samples of carbon nanotubes, and particles released from mining activity in an experimental metal mine, among many other examples. Further, the sampled particles may be fibrous and/or non-fibrous particles, and spherical primary particles such as metal, non-metal or metal-oxide nanoparticles, primary fibrous particles, and agglomerates of all these particles may be collected using the air sampler 10. The sampling pump 202 generates a pressure that draws air from the environment through the inlet 114 into an interior of the cassette housing 100 where particles are collected. As described herein, the sampling pump 202 may be running at approximately 0.3 L/min air flow. The air is expelled from the cassette housing 100 into the nozzle 204.

The air sampling system 200 may be used to sample a variety of different types of particles. In one particular non-limiting example for illustration purposes only, the air sampling system 200 may be used to sample Crystalline aluminum oxide ($Al_2O_3$) nanopowder with a density of 3600 kg/$m^3$ and primary particle size of 40 nm. Such a nanopowder generally includes a wide range of aerosol particle sizes from individual primary particles to small and large agglomerates. The powder may become aerosolized through agitation and directed with the air, moving at the air velocity, which may be for example, 1 to 7.6 cm/s (2 to 15 ft/min) for horizontal direction and from 0 to 3 cm/s (0 to 6 ft/min) for vertical direction. In this example, aerosol generation occurs for approximately 40 minutes. The particles are collected on the filter 126 and the gird 128 through diffusion, as described herein. After sampling, the sampling substrate 124 is removed from the cassette housing 100 for direct analysis using a TEM and/or SEM.

A variety of imaging protocols may be used to directly capture images of the particles on the filter 126 and/or the grid 128 using the TEM and/or SEM, and a variety of imaging software executed by at least one computing device, such as those described with respect to FIG. 8, may be used to analyze the images.

In one implementation, TEM imaging protocol may be utilized to analyze grid 128, including capturing five low magnification (50×) images to encompass the entire grid 128 (e.g., center, and four quadrants). Four grid spaces may be selected equidistant two spaces from the grid center and imaged at 500×. These chosen grid spaces may be imaged by traversing (9-12 images per grid) the grid space at 5000x until 300 particles are imaged. For analysis of the filter 126 using the SEM, the filters were prepared by cutting a ⅛$^{th}$ slice of the filter 126 and coating with 10 nm of gold. Three sections of the filters were imaged (e.g., center, middle, and edge) at 9000-25000× until 300 particles were imaged per sample. Particle images were analyzed using imaging software to count and measure particle size. The particle sizes were organized following 13 bin ranges within 10 nm to 420 nm and 14 bin ranges above 420 nm to 10 μm, to plot particle count frequency with size distribution and cumulative percent particle counts.

More particularly, imaging protocol to analyze the grid 128 using TEM includes removing the grid 128 from the filter 126 and placing the grid 128 on a TEM grid holder. The holder is then placed inside the TEM. In some cases, the grid 128 can be stored in a grid storage case before performing the analysis. A plurality of low magnification images (e.g., 5 images at a magnification of 50×) are captured using the TEM to encompass the entire grid 128 (e.g., center, and four quadrants). A plurality of grid spaces (e.g., 4 grid spaces) disposed equidistant (e.g., two spaces) from the grid center are selected and imaged at an increased (e.g., 500×) magnification. For size-fractioned particle counting analysis, approximately 300 or more particles are included with a first range of magnification and a second range of magnification. For particles with a typical diameter smaller than 1 μm, the chosen grid spaces are imaged by traversing the grid space at the first magnification range (e.g., between 5000× and 50,000×) until approximately 300 or more particles/agglomerates are imaged. For particles with a typical diameter that is larger than 1 μm, the chosen grid spaces are imaged by traversing the grid space at the second magnification range (e.g., between 500× and 6000×) until approximately 300 or more particles/agglomerates are imaged.

The imaging protocol to analyze the filter 126 using SEM includes preparing the filter 126 by cutting a slice (e.g., ⅛$^{th}$) of the filter 126. The slice may be cut for example in a triangle piece across from the center to the edge of the filter 126. However, other shapes are contemplated. The slice is coated with a coating material, such as 10 nm of gold. A plurality of sections (e.g., center, middle, and edge) of the slice of the filter 126 is imaged at a magnification of 2000× to 25000×. Images are captured until approximately 300 or more particle/agglomerates are included in images per sample.

The images captured from the TEM and/or SEM are analyzed using imaging software to count and measure particle area for diameter conversion. Gatan digital micrograph may be used for counting and measuring particle diameters for size bin sorting. In one implementation, particle counts are organized by following the bin ranges of a real time instrument (RTI) to count the number of particles in each bin range. In this implementation, particle diameter is estimated as the equivalent diameter of measured two-dimensional area of particle image. In another implementation, particle size is organized using their maximum crosswise dimension and placed into size bins of smaller than 1 μm, 1 to 2 μm, 2 to 5 μm and 5 to 10 μm. For analyzing fibers, individual fibers with an aspect ratio larger than 3 to 1 may be counted. The clusters of fibrous particle are measured using their maximum crosswise dimension and then place into size bins of smaller than 1 μm, 1 to 2 μm, 2 to 5 μm, 5 to 10 μm, and larger than 10 μm.

In one implementation, based on an assumption of approximately 100% collection of particles at the center of the filter, an airborne particle number concentration entering the air sampler 10 can be determined. For the air sampler 10, an effective filter area of 415 mm$^2$ (23 mm diameter) is used and an opening area of 1.37×10$^{-3}$ mm$^2$ for the grid 128 is used. The volume is equal to flowrate (e.g., 0.3 L/min) multiply by sampling time (min). The overall particle count in the range of 10 nm to 10 μm or the particle count in the specific size bin can be converted using the following equation to obtain overall particle number concentration. A size-fractioned particle number concentration is calculated use the number of particle of a specific size bin.

$$\frac{\text{Total Number of } \frac{\text{Particles}}{\text{Fiber}} \text{ Structures}}{\text{cm}^3} = \frac{\text{Total Number of Structures from 4 Grid Openings}}{\text{Number of Grid Opening Counted (4)}} \times \frac{1}{\text{Volume}(L)} \times \frac{\text{Effective Filter Area (mm}^2)}{\text{One Grid Opening Area (mm}^2)} \times \frac{1L}{1000 \text{ cm}^3}$$

In the illustrative example of collection of aluminum oxide particles, the particles had an average primary size of 40 nm diameter with small primary particles less than 40 nm and agglomerates ranged in nanometer to micrometer sizes. The concentration of each size bin and standard deviation data are included in the table below:

| Particle Diameter (nm) | SMPS Conc. [Particle/cm$^3$] | SMPS STD | Particle Diameter (nm) | OPS Conc. [Particle/cm$^3$] | OPS STD |
|---|---|---|---|---|---|
| 12 | 12.2 | 19.7 | 337 | 40.1 | 83.5 |
| 15 | 20.5 | 42.0 | 419 | 6.3 | 13.1 |
| 21 | 33.3 | 70.8 | 522 | 3.1 | 6.5 |
| 27 | 57.5 | 72.3 | 650 | 1.1 | 2.2 |
| 37 | 79.2 | 112.0 | 809 | 0.9 | 2.0 |
| 49 | 94.8 | 329.8 | 1007 | 1.2 | 2.7 |
| 65 | 132.7 | 479.1 | 1254 | 0.7 | 1.5 |
| 87 | 263.0 | 1143.3 | 1562 | 1.2 | 2.7 |
| 116 | 450.8 | 1763.7 | 1944 | 2.1 | 4.7 |
| 154 | 572.6 | 1717.7 | 2421 | 2.9 | 6.7 |
| 205 | 450.4 | 1022.6 | 3014 | 3.9 | 9.0 |
| 274 | 243.2 | 489.6 | 3752 | 5.6 | 12.9 |
| 365 | 114.8 | 273.4 | 4672 | 7.3 | 16.9 |
|  |  |  | 5816 | 7.8 | 18.3 |
|  |  |  | 7242 | 8.7 | 19.8 |
|  |  |  | 9016 | 9.9 | 22.6 |

The size distributions of generated airborne aluminum oxide particles measured by a Nanoscan Scanning Mobility Particle Sizer (SMPS) are shown in the size range from 10 to 420 nm with the mode size measured to be 154 nm. The Optical Particle Sizer (OPS) measurements showed increasing concentrations toward to both minimum and maximum sizes measured by the instrument. The average particle number concentration during 62 min (62 data) of sampling measured by the Nanoscan SMPS (10-420 nm) and by OPS (0.3-10 μm) were 237 particles/cm$^3$ and 7 particles/cm$^3$, respectively. The peak emission showed concentrations in a range from about 50 to greater than 4000 particles/cm$^3$ for particles smaller than 420 nm, and the particle counts for larger particles above 0.3 μm ranged from a few particles to about 80 particles/cm$^3$. The particle counts were aluminum oxide particles only with essentially 0 particles from the ambient background. These emissions represented a low concentration range representative of a typical exposure in none occupational environment.

Collected particles on the filter and grid may be analyzed separately using SEM and TEM. Small particles and agglomerates similar to or smaller than the pore size of the filter 126 are collected between pores and/or trapped on pores. The grid 128 collects particles on the grid space, with many particles collected on each grid space, most of which being primary particles or small agglomerates. A plurality of images of the collected particles on the filter 126 and the spaces of the grid 128 are taken to obtain a minimum of 300 particles being counted and analyzed to obtain their sizes. Particles on the filter 126 range in size from 36 to 5,800 nm, and particles on the grid 128 range in size from 15 to 1,560 nm. The particle mean diameters are 793 nm and 130 nm, respectively, for aluminum oxide particles on the filter 126 and the grid 128. Based on the particle count size distribution, particle characteristics are analyzed. For the example of the aluminum oxide particles, the characteristics are summarized below:

| $Al_2O_3$ particles | Particles on filter | Particles on grid |
|---|---|---|
| Particle mean diameter | 793 nm | 130 nm |
| Mean diameter standard deviation | 591 nm | 127 nm |
| Geometric mean diameter, $d_g$ | 641 nm | 92 nm |
| Geometric standard deviation, $\sigma_g$ | 1.97 | 2.30 |
| Count median diameter, CMD | 500 nm | 100 nm |
| Mass median diameter, MMD | 1,987 nm | 793 nm |
| Mass median aerodynamic diameter, MMAD | 3,770 nm | 1,505 nm |

The geometric mean diameter, $d_g$, and the geometric standard deviation, $\sigma_g$, may be calculated as follows:

$$\ln d_g = \frac{\Sigma n_i \ln d_i}{N}$$

$$\ln \sigma_g = \left(\frac{\Sigma n_i (\ln d_i - \ln d_g)^2}{N-1}\right)^{1/2}$$

CMD may be obtained from a cumulative percentile at 50% cumulative particle size and converted to MMD of aluminum oxide particles utilizing the Hatch-Choate conversion equation:

$$MMD = CMD \exp(3 \ln^2 \sigma_g)$$

The mass median aerodynamic diameter (MMAD) may then be determined as follows:

$d_a = d_p (\rho_p/\rho_0)^{1/2}$, where $d_a$ is aerodynamic diameter, $d_p$ is particle diameter, $\rho_p$ is particle density, and $\rho_0$ is standard particle density which is 1 g/cm$^3$.

For aluminum oxide particles collected on the polycarbonate filter of this sampler, the CMD was 500 nm (0.5 µm) and the MMD was approximately 2 µm. For a lognormal count distribution, $d_g$ is equal to the CMD. As can be understood from the summarized characteristics, $d_g$ and CMD differ because the underlying distribution is not actually log-normal. The equivalent MMAD of aluminum oxide particles would be approximately 3.8 µm.

When compared to an RTI, such as a Nanoscan SMPS or OPS, the air sampler 10 had smaller particle modes at 65 nm and 116 nm. The SMPS, for example, measures such particles at 154 nm. Moreover, the size range of particles from image analysis for the air sampler 10 extended above 420 nm, the maximum size measured by SMPS. Additionally, the SMPS cannot directly compare the absolute sizes of measured particles. The SMPS measures the electrical mobility size of particles, which is correlated with the electrical charge on the surface of three dimensional particles, to determine particle diameter. However, the size analysis of collected particles is based on two-dimensional particle images used to measure the area of imaged individual particles and agglomerates, which is then used to calculate the diameter of equivalent spherical particles. The OPS shows increased particle concentration toward to the maximum size of 10 µm. On the other hand, the air sampler 10 collects particle sizes up to 8 µm aerodynamic diameter such that that larger particle agglomerates do not enter the inlet opening 118. These factors create differences in measurements by these devices.

Motion of a particle while entering the cassette housing 100 through the inlet opening 118 and inside the cassette housing 100 will vary by its diameter. This relationship can be interpreted using the particle Stokes number, as described herein with example data included in the table below:

| | $Al_2O_3$ Particles | | | Standard Density Particles | | |
|---|---|---|---|---|---|---|
| d (µm) | τ (sec) | Stk at inlet | Stk in cassette | τ (sec) | Stk at inlet | Stk in cassette |
| 0.005 | 2.76E−10 | 1.40E−06 | 8.00E−11 | 7.67E−11 | 3.89E−07 | 2.22E−11 |
| 0.010 | 1.10E−09 | 5.60E−06 | 3.20E−10 | 3.07E−10 | 1.55E−06 | 8.89E−11 |
| 0.015 | 2.49E−09 | 1.26E−05 | 7.20E−10 | 6.91E−10 | 3.50E−06 | 2.00E−10 |
| 0.020 | 4.42E−09 | 2.24E−05 | 1.28E−09 | 1.23E−09 | 6.22E−06 | 3.56E−10 |
| 0.027 | 8.06E−09 | 4.08E−05 | 2.33E−09 | 2.24E−09 | 1.13E−05 | 6.48E−10 |
| 0.036 | 1.43E−08 | 7.25E−05 | 4.15E−09 | 3.98E−09 | 2.02E−05 | 1.15E−09 |
| 0.050 | 2.76E−08 | 1.40E−04 | 8.00E−09 | 7.67E−09 | 3.89E−05 | 2.22E−09 |
| 0.065 | 4.67E−08 | 2.37E−04 | 1.35E−08 | 1.30E−08 | 6.57E−05 | 3.76E−09 |
| 0.087 | 8.36E−08 | 4.24E−04 | 2.42E−08 | 2.32E−08 | 1.18E−04 | 6.73E−09 |
| 0.115 | 1.46E−07 | 7.40E−04 | 4.23E−08 | 4.06E−08 | 2.06E−04 | 1.18E−08 |
| 0.154 | 2.62E−07 | 1.33E−03 | 7.59E−08 | 7.28E−08 | 3.69E−04 | 2.11E−08 |
| 0.205 | 4.64E−07 | 2.35E−03 | 1.35E−07 | 1.29E−07 | 6.53E−04 | 3.74E−08 |
| 0.174 | 3.35E−07 | 1.69E−03 | 9.69E−08 | 9.29E−08 | 4.71E−04 | 2.69E−08 |
| 0.337 | 1.25E−06 | 6.36E−03 | 3.63E−07 | 3.49E−07 | 1.77E−03 | 1.01E−07 |
| 0.419 | 1.94E−06 | 9.83E−03 | 5.62E−07 | 5.39E−07 | 2.73E−03 | 1.56E−07 |
| 0.522 | 3.01E−06 | 1.53E−02 | 8.72E−07 | 8.36E−07 | 4.24E−03 | 2.42E−07 |
| 0.650 | 4.67E−06 | 2.37E−02 | 1.35E−06 | 1.30E−06 | 6.57E−03 | 3.76E−07 |
| 0.809 | 7.23E−06 | 3.66E−02 | 2.09E−06 | 2.01E−06 | 1.02E−02 | 5.82E−07 |
| 1.007 | 1.12E−05 | 5.68E−02 | 3.25E−06 | 3.11E−06 | 1.58E−02 | 9.02E−07 |
| 1.254 | 1.74E−05 | 8.80E−02 | 5.03E−06 | 4.83E−06 | 2.45E−02 | 1.40E−06 |
| 1.562 | 2.70E−05 | 1.37E−01 | 7.81E−06 | 7.49E−06 | 3.79E−02 | 2.17E−06 |

-continued

| | Al$_2$O$_3$ Particles | | | Standard Density Particles | | |
|---|---|---|---|---|---|---|
| d (μm) | τ (sec) | Stk at inlet | Stk in cassette | τ (sec) | Stk at inlet | Stk in cassette |
| 1.944 | 4.18E−05 | 2.12E−01 | 1.21E−05 | 1.16E−05 | 5.88E−02 | 3.36E−06 |
| 2.421 | 6.48E−05 | 3.28E−01 | 1.88E−05 | 1.80E−05 | 9.11E−02 | 5.21E−06 |
| 3.014 | 1.00E−04 | 5.09E−01 | 2.91E−05 | 2.79E−05 | 1.41E−01 | 8.08E−06 |
| 3.752 | 1.56E−04 | 7.88E−01 | 4.51E−05 | 4.32E−05 | 2.19E−01 | 1.25E−05 |
| 3.800 | 1.60E−04 | 8.08E−01 | 4.62E−05 | 4.43E−05 | 2.25E−01 | 1.28E−05 |
| 3.900 | 1.68E−04 | 8.51E−01 | 4.87E−05 | 4.67E−05 | 2.37E−01 | 1.35E−05 |
| 4.000 | 1.77E−04 | 8.96E−01 | 5.12E−05 | 4.91E−05 | 2.49E−01 | 1.42E−05 |
| 4.100 | 1.86E−04 | 9.41E−01 | 5.38E−05 | 5.16E−05 | 2.61E−01 | 1.49E−05 |
| 4.200 | 1.95E−04 | 9.87E−01 | 5.65E−05 | 5.41E−05 | 2.74E−01 | 1.57E−05 |
| 4.300 | 2.04E−04 | 1.04E+00 | 5.92E−05 | 5.68E−05 | 2.88E−01 | 1.64E−05 |
| 4.400 | 2.14E−04 | 1.08E+00 | 6.20E−05 | 5.94E−05 | 3.01E−01 | 1.72E−05 |
| 4.500 | 2.24E−04 | 1.13E+00 | 6.48E−05 | 6.22E−05 | 3.15E−01 | 1.80E−05 |
| 4.672 | 2.41E−04 | 1.22E+00 | 6.99E−05 | 6.70E−05 | 3.39E−01 | 1.94E−05 |
| 5.000 | 2.76E−04 | 1.40E+00 | 8.00E−05 | 7.67E−05 | 3.89E−01 | 2.22E−05 |
| 5.500 | 3.34E−04 | 1.69E+00 | 9.68E−05 | 9.28E−05 | 4.70E−01 | 2.69E−05 |
| 6.000 | 3.98E−04 | 2.02E+00 | 1.15E−04 | 1.10E−04 | 5.60E−01 | 3.20E−05 |
| 6.500 | 4.67E−04 | 2.37E+00 | 1.35E−04 | 1.30E−04 | 6.57E−01 | 3.76E−05 |
| 7.000 | 5.41E−04 | 2.74E+00 | 1.57E−04 | 1.50E−04 | 7.62E−01 | 4.36E−05 |
| 7.500 | 6.22E−04 | 3.15E+00 | 1.80E−04 | 1.73E−04 | 8.75E−01 | 5.00E−05 |
| 8.000 | 7.07E−04 | 3.58E+00 | 2.05E−04 | 1.96E−04 | 9.95E−01 | 5.69E−05 |
| 8.500 | 7.98E−04 | 4.04E+00 | 2.31E−04 | 2.22E−04 | 1.12E+00 | 6.42E−05 |
| 9.000 | 8.95E−04 | 4.53E+00 | 2.59E−04 | 2.49E−04 | 1.26E+00 | 7.20E−05 |
| 9.500 | 9.97E−04 | 5.05E+00 | 2.89E−04 | 2.77E−04 | 1.40E+00 | 8.02E−05 |
| 10.000 | 1.10E−03 | 5.60E+00 | 3.20E−04 | 3.07E−04 | 1.55E+00 | 8.89E−05 |

When particles enter the inlet opening 118 in the example above, aluminum oxide particles approximately 4 μm or smaller will follow the air streamline since the Stokes number is less than 1. For standard-density particles, diameters approximately 8 μm or smaller will follow the air streamline in the inlet opening 118, since their Stokes number is less than 1. This determines the maximum particle size entering the cassette housing 100. Once particles enter into the cassette housing 100, all Stokes numbers are extremely small for particles 10 μm or smaller. Thus, all particles will follow air streamlines.

Contrary to other nanoparticle samplers, quantitative analysis can be performed using the air sampler 10 since 100% of the particles entering the cassette housing 100 are collected on the sampling substrate 124. The particle number concentration can be estimated from the number of particles counted per image, the area of the grid opening that was imaged, the sampling air flow, and the sampling time period to provide a quantitative analysis of size-fractioned particle concentration.

Figure 6:
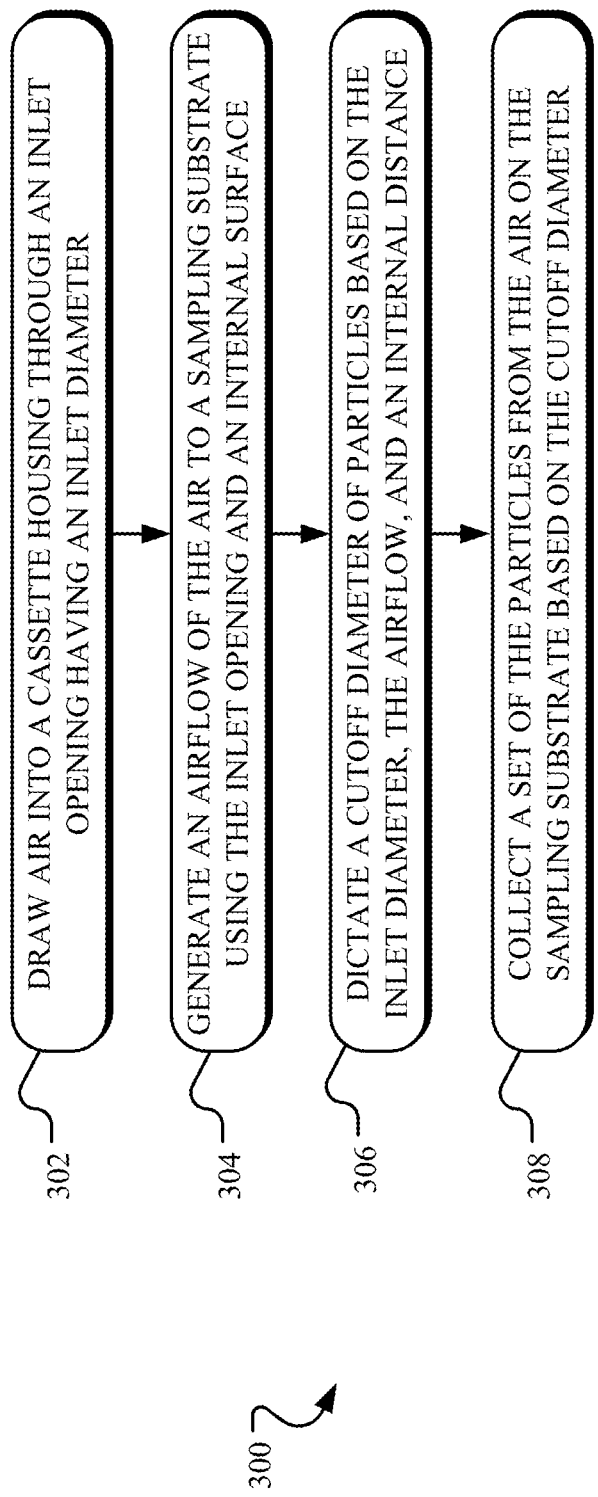
FIG. 6 illustrates example operations for sampling particles from air using an air sampler.

Referring to FIG. 6, example operations 300 for sampling particles from air are shown. In one implementation, an operation 302 draws an into a cassette housing through an inlet opening. The inlet opening has an inlet diameter. The operation 302 may draw the air into the cassette housing using a personal sampling pump, for example. An operation 304 generates an airflow of the air to a sampling substrate using the inlet opening and an internal surface. The internal surface extends along an airflow curve from the inlet opening to the sampling substrate. The sampling substrate is formed by attached a grid to a filter. The grid may be attached to a center of a surface of the filter that is proximal to the inlet opening. The grid may be attached to the filter using tape. The sampling substrate is disposed at an internal distance from the inlet opening.

An operation 306 dictates a cutoff diameter of particles based on the inlet diameter, the airflow, and the internal distance. An operation 308 collects a set of the particles from the air on the sampling substrate based on the cutoff diameter. The operation 308 may collect the set of particles through diffusion. The cutoff diameter may be a mass median aerodynamic diameter of 3.8 μm.

Figure 7:
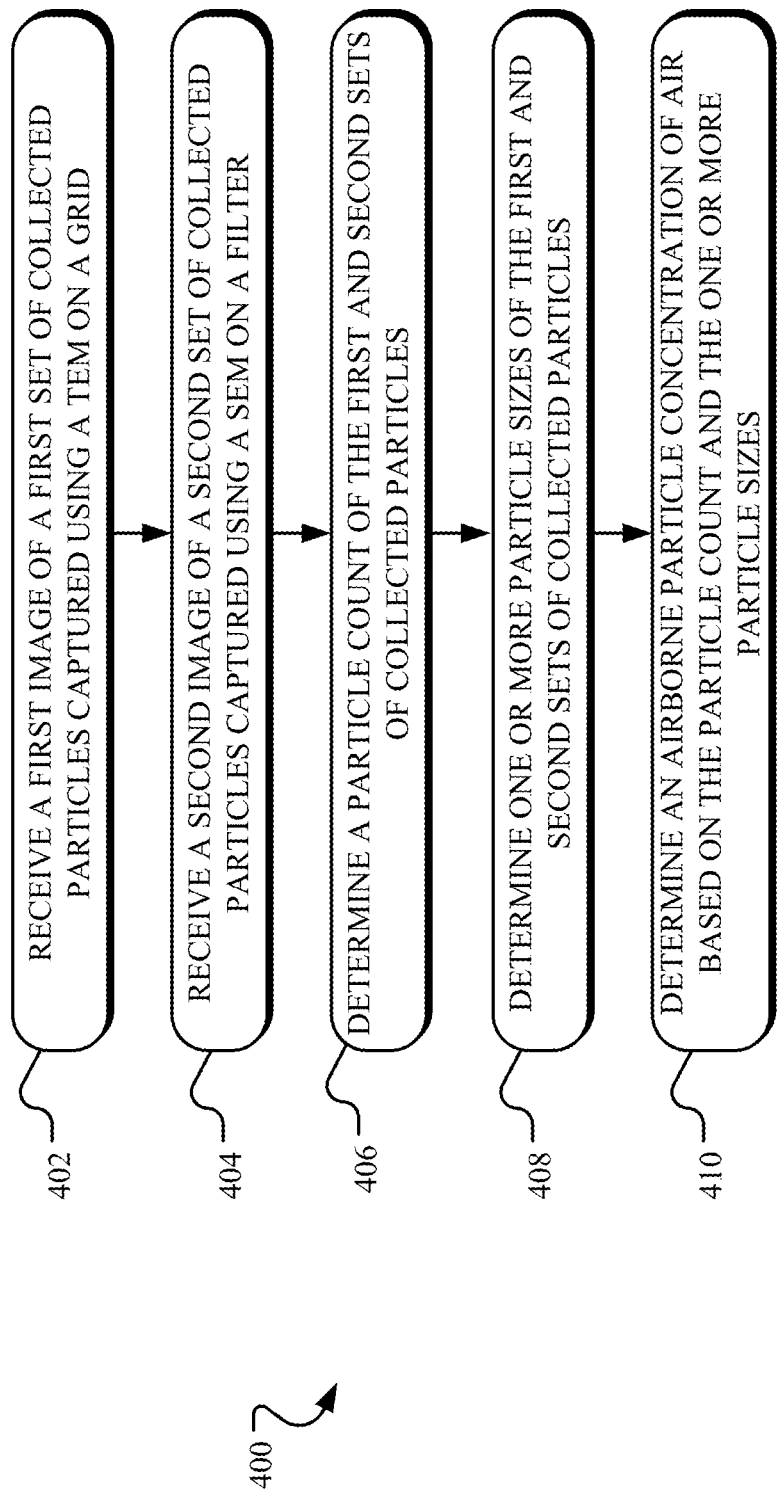
FIG. 7 illustrates example operations for analyzing particles collected using an air sampler.

Turning to FIG. 7, example operations 400 for sampling particles from air are shown. In one implementation, an operation 402 receives a first image of a first set of collected particles captured using a TEM on a grid. The first set of collected particles may be collected directly on the grid of a sampling substrate.

An operation 404 receives a second image of a second set of collected particles captured using an SEM on a filter. The second set of collected particles are collected directly on the filter of the sampling substrate. The sampling substrate is disposed at an internal distance from an inlet opening defined in a cassette housing. A cutoff diameter of the first and second sets of collected particles is dictated by an inlet diameter of the inlet opening, the internal distance, and an airflow generated using the inlet opening and an internal surface extending along an airflow curve from the inlet opening to the sampling substrate.

An operation 406 determines a particle count of the first and second sets of collected particles by analyzing the first image and the second image using at least one computing unit. An operation 408 determines one or more particle sizes of the first and second sets of collected particles by analyzing the first image and the second image using the at least one computing unit. An operation 410 determines an airborne particle concentration of the air based on the particle count and the one or more particles sizes.

Figure 8:
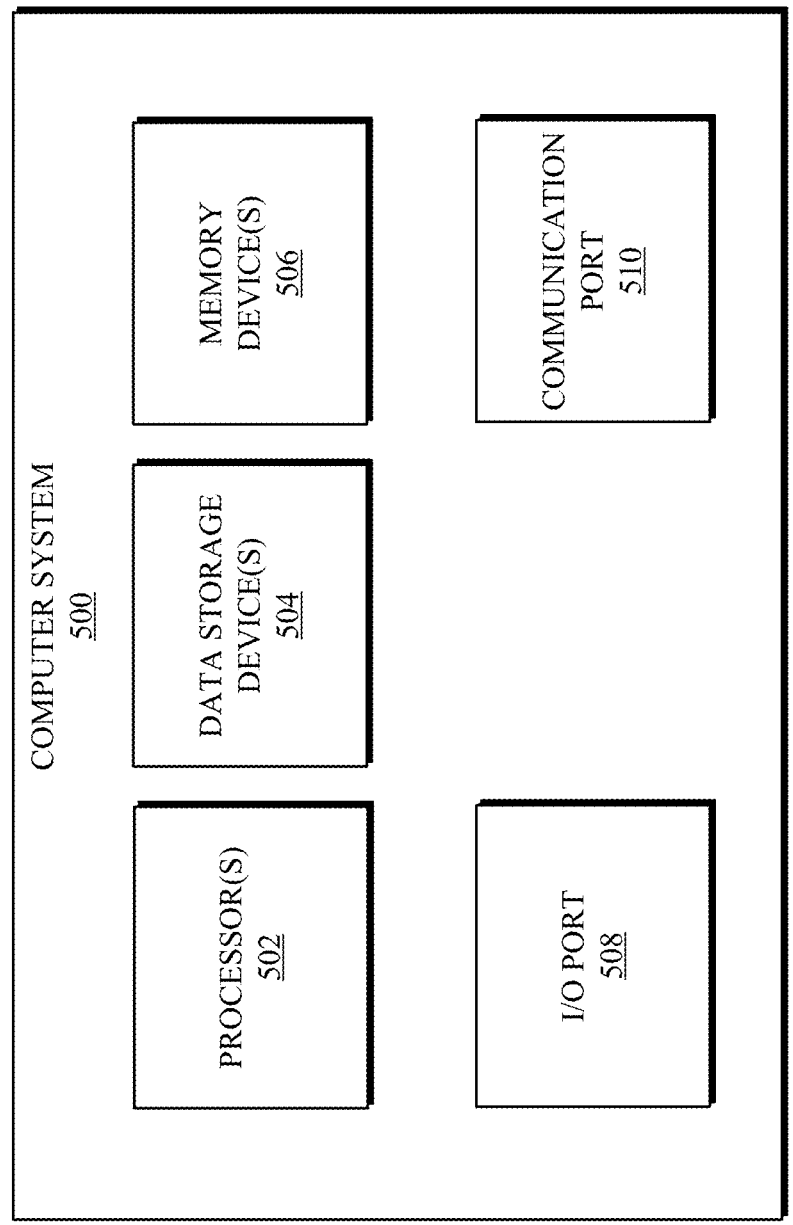
FIG. 8 shows a computing system having one or more computing units that may implement aspects of the presently disclosed technology.

Referring to FIG. 8, a detailed description of an example computing system 500 having one or more computing units that may implement various systems and methods discussed herein, such as the particle image analysis, is provided. The computing system 500 may be applicable to various computing or network devices to analyze particles captured in one or more images from a TEM, SEM, and/or other imaging devices. It will be appreciated that specific implementations of these devices may be of differing possible specific computing architectures not all of which are specifically discussed herein but will be understood by those of ordinary skill in the art.

The computer system 500 may be a computing system is capable of executing a computer program product to execute a computer process. Data and program files may be input to the computer system 500, which reads the files and executes the programs therein. Some of the elements of the computer system 500 are shown in FIG. 8, including one or more hardware processors 502, one or more data storage devices 504, one or more memory devices 508, and/or one or more ports 508-510. Additionally, other elements that will be recognized by those skilled in the art may be included in the computing system 500 but are not explicitly depicted in FIG. 8 or discussed further herein. Various elements of the computer system 500 may communicate with one another by way of one or more communication buses, point-to-point communication paths, or other communication means not explicitly depicted in FIG. 8.

The processor 502 may include, for example, a central processing unit (CPU), a microprocessor, a microcontroller, a digital signal processor (DSP), and/or one or more internal levels of cache. There may be one or more processors 502, such that the processor 502 comprises a single central-processing unit, or a plurality of processing units capable of executing instructions and performing operations in parallel with each other, commonly referred to as a parallel processing environment.

The computer system 500 may be a conventional computer, a distributed computer, or any other type of computer, such as one or more external computers made available via a cloud computing architecture. The presently described technology is optionally implemented in software stored on the data stored device(s) 504, stored on the memory device(s) 506, and/or communicated via one or more of the ports 508-510, thereby transforming the computer system 500 in FIG. 8 to a special purpose machine for implementing the operations described herein. Examples of the computer system 500 include personal computers, terminals, workstations, mobile phones, tablets, laptops, personal computers, multimedia consoles, gaming consoles, set top boxes, and the like.

The one or more data storage devices 504 may include any non-volatile data storage device capable of storing data generated or employed within the computing system 500, such as computer executable instructions for performing a computer process, which may include instructions of both application programs and an operating system (OS) that manages the various components of the computing system 500. The data storage devices 504 may include, without limitation, magnetic disk drives, optical disk drives, solid state drives (SSDs), flash drives, and the like. The data storage devices 504 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 506 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 504 and/or the memory devices 506, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 500 includes one or more ports, such as an input/output (I/O) port 508 and a communication port 510, for communicating with other computing, network, or vehicle devices. It will be appreciated that the ports 508-510 may be combined or separate and that more or fewer ports may be included in the computer system 500.

The I/O port 508 may be connected to an I/O device, or other device, by which information is input to or output from the computing system 500. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 500 via the I/O port 508. Similarly, the output devices may convert electrical signals received from computing system 500 via the I/O port 508 into signals that may be sensed as output by a human, such as sound, light, and/or touch. The input device may be an alphanumeric input device, including alphanumeric and other keys for communicating information and/or command selections to the processor 502 via the I/O port 508. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 500 via the I/O port 508. For example, an electrical signal generated within the computing system 500 may be converted to another type of signal, and/or vice-versa. In one implementation, the environment transducer devices sense characteristics or aspects of an environment local to or remote from the computing device 500, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 500, such as, physical movement of some object (e.g., a mechanical actuator), heating or cooling of a substance, adding a chemical substance, and/or the like.

In one implementation, a communication port 510 is connected to a network by way of which the computer system 500 may receive network data useful in executing the methods and systems set out herein as well as transmitting information and network configuration changes determined thereby. Stated differently, the communication port 510 connects the computer system 500 to one or more communication interface devices configured to transmit and/or receive information between the computing system 500 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 510 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 510 may communicate with an antenna or other link for electromagnetic signal transmission and/or reception.

In an example implementation, particle sample data and software and other modules and services may be embodied by instructions stored on the data storage devices 504 and/or the memory devices 506 and executed by the processor 502.

The system set forth in FIG. 8 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, based upon design preferences, it is understood that the specific order or hierarchy of steps in the methods described herein can be rearranged while remaining within the disclosed subject matter. Any accompanying method claims present elements of the various steps in a sample order and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The above specification, examples, and data provide a complete description of the structure and use of example implementations of the invention. Various modifications and additions can be made to the exemplary implementations discussed without departing from the spirit and scope of the presently disclosed technology. For example, while the implementations described above refer to particular features, the scope of this disclosure also includes implementations having different combinations of features and implementations that do not include all of the described features. Accordingly, the scope of the presently disclosed technology is intended to embrace all such alternatives, modifications, and variations together with all equivalents thereof.

What is claimed is:

1. A system for sampling particles from air, the system comprising:
   a cassette housing formed from a cassette top and a cassette bottom;
   an internal cavity formed within the cassette housing;
   an inlet opening defined in a proximal end of the cassette top, the inlet opening having an inlet diameter;
   a curved internal surface defined in the top cassette, the curved internal surface comprising a contour with a curve extending from the inlet opening around the internal cavity to define an airflow curve;
   a filter having a plurality of pores; and
   a sampling substrate formed by at least one grid attached to the filter, the sampling substrate disposed in the internal cavity at an internal distance from the inlet opening, the inlet diameter being 2 millimeters (mm) and the internal distance being 6 mm when the cassette housing has a diameter of 25 mm, the inlet opening and the airflow curve of the internal surface generating an airflow of the air to the sampling substrate, the sampling substrate collecting a set of the particles from the air, the inlet diameter, the airflow, and the internal distance dictating a cutoff diameter of the set of particles collected from the air by the sampling substrate.

2. The system of claim 1, wherein the set of particles are collected directly on the sampling substrate.

3. The system of claim 1, wherein the set of particles are collected on both the at least one grid and the filter through diffusion.

4. The system of claim 1, wherein the at least one grid is a film coated transmission electron microscopy grid.

5. The system of claim 1, wherein the filter is a polycarbonate membrane filter.

6. The system of claim 1, wherein the filter is supported by a support screen.

7. The system of claim 1, wherein the grid is attached to the filter with tape.

8. The system of claim 1, wherein a first portion of the set of particles are collected on the at least one grid and a second portion of the set of particles are collected on the filter.

9. The system of claim 8, wherein the second portion includes particles having a diameter that is greater than that of the first portion of the set of particles but less than the cutoff diameter.

10. The system of claim 8, wherein the first portion is analyzable directly by a transmission electron microscope on the grid.

11. The system of claim 8, wherein the second portion is analyzable directly by a scanning electron microscope on the filter.

12. A method for sampling particles from air, the method comprising:
   drawing the air into a cassette housing through an inlet opening, the inlet opening having an inlet diameter;
   generating an airflow of the air to a sampling substrate using the inlet opening and an internal surface comprising a contour with a curve extending from the inlet opening to the sampling substrate to define an airflow curve, the sampling substrate formed by attaching at least one grid to a filter and disposed at an internal distance from the inlet opening, the inlet diameter being 2 millimeters (mm) and the internal distance being 6 mm when the cassette housing has a diameter of 25 mm;
   dictating a cutoff diameter of particles based on the inlet diameter, the airflow, and the internal distance; and
   collecting a set of the particles from the air on the sampling substrate based on the cutoff diameter.

13. The method of claim 12, wherein the set of the particles is collected on the sampling substrate through diffusion.

14. The method of claim 12, wherein one of the at least one grid is attached to a center of a surface of the filter proximal to the inlet opening.

15. The method of claim 12, wherein the air is drawn into the cassette housing using a personal sampling pump.

16. The method of claim 12, wherein the cutoff diameter is a mass median aerodynamic diameter of 3.8 μm.

17. A device for sampling particles from air, the device comprising:
   a cassette housing formed from a cassette top and a cassette bottom;
   an internal cavity formed within the cassette housing;
   an inlet opening at a proximal end of the cassette top, the inlet opening having an inlet diameter;
   a filter having a plurality of pores;
   an internal surface defined by the top cassette, the internal surface comprising a contour with a curve extending from the inlet opening to the filter; and
   a sampling substrate formed by at least one grid attached to the filter, the sampling substrate disposed in the internal cavity at an internal distance from the inlet opening, the inlet diameter being 2 millimeters (mm) and the internal distance being 6 mm when the cassette housing has a diameter of 25 mm, the inlet opening and the contour of the internal surface generating an airflow of the air to the sampling substrate, the sampling substrate collecting a set of the particles from the air, the inlet diameter, the airflow, and the internal distance dictating a cutoff diameter of the set of particles collected from the air by the sampling substrate.

\* \* \* \* \*